INVENTOR
C. LLOYD CLAFF
BY Kenway, Jenney + Hildreth
ATTORNEYS

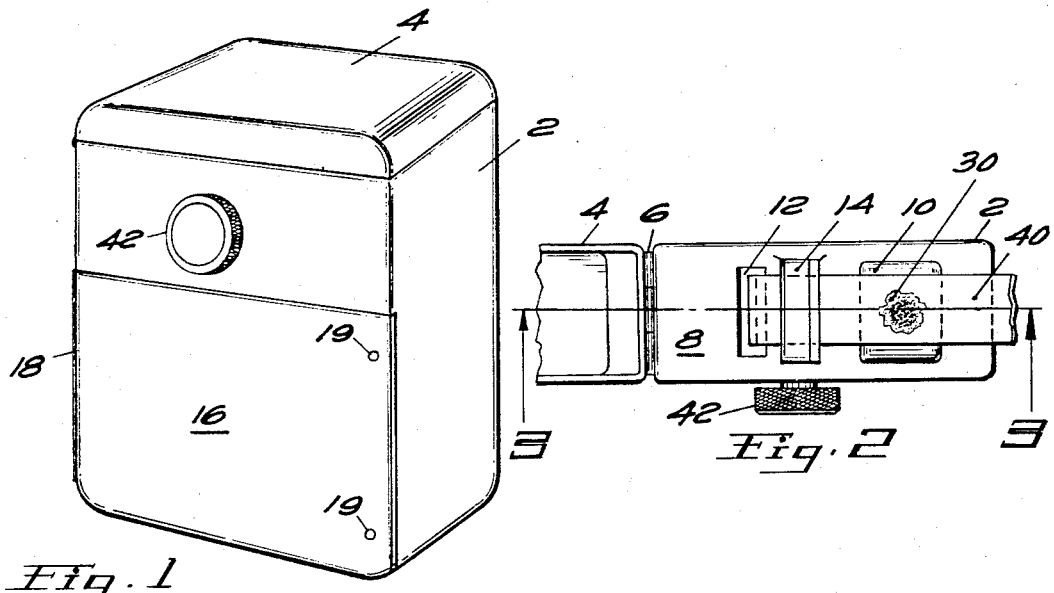
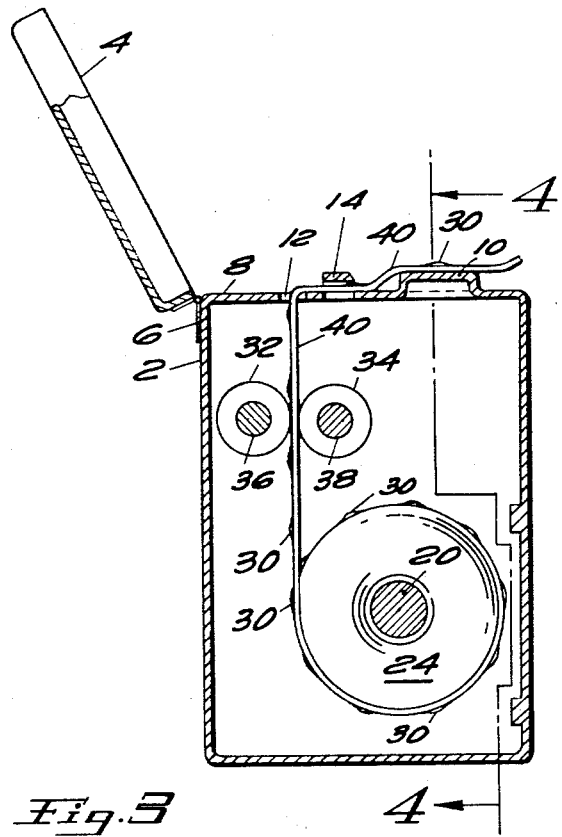
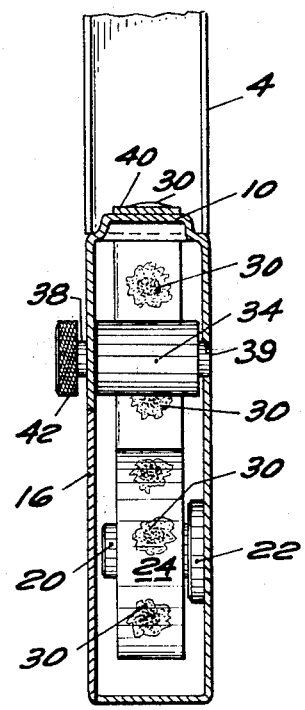
Fig. 1
Fig. 2
Fig. 3
Fig. 4
INVENTOR
C. LLOYD CLAFF
BY Kenway, Jenney + Hildreth
ATTORNEYS April 29, 1969   C. L. CLAFF   3,441,353
PERFUME DISPENSER Filed Jan. 31, 1967   Sheet 3 of 4

INVENTOR.
C. LLOYD CLAFF
BY Kenway, Jenney + Hildreth
ATTORNEYS

United States Patent Office 3,441,353
Patented Apr. 29, 1969

3,441,353
PERFUME DISPENSER
Clarence Lloyd Claff, 5 Van Beal Road,
Randolph, Mass. 02368
Filed Jan. 31, 1967, Ser. No. 612,923
Int. Cl. A45d 34/00
U.S. Cl. 401—132          4 Claims

ABSTRACT OF THE DISCLOSURE

This invention relates to a perfume dispenser and to the combination of the dispenser and encapsulated perfume contained therein. Several species of container are provided for holding perfume which has been micro-encapsulated, the capsules either being held on tape material such as absorbent thin paper, cloth, or plastic within the container, or loosely; and manually operable means are provided for bringing the encapsulated perfume to a position where the capsules may be crushed, thus releasing perfume exteriorly of the container for use by the user thereof.

Background of invention

Perfume dispensers known in the art fall generally into two classes, one being the spray or atomizer type; and the other being a type in which liquid perfume is applied to the skin of the user either by means of an applicator wet by the perfume, or by contacting a small orifice at the end of the perfume bottle directly with the skin. In both types, the perfume (which is highly volatile) is enabled to evaporate, albeit slowly; and in the both types, it is necessary to provide a cap on the perfume container in order to prevent such evaporation or even leakage.

It is the general purpose of this invention to provide a container for perfume in which the perfume is readily available but without evaporation, and a fresh supply thereof may be readily dispensed for use; and one from which the perfume is not spillable.

Therefore, among the several objects and advantages of the invention may be noted the provision of a combination perfume container in which means are provided for holding perfume in encapsulated form, with additional manually actuable means for crushing the capsules when desired to dispense the perfume, the provision of a perfume dispenser of the above class in which the encapsulated perfume is held on tape at discrete positions; the provision of perfume dispensers of either of the above classes in which the tape is ejected from the machine, and crushing is done manually against an exteriorly mounted anvil; the provision of a perfume container in which the encapsulated perfume capsules are held loosely in the container, but are crushed between rollers by manual actuation thereof, the perfume from the crushed capsules being conveyed to the exterior of the container by means of a rotatable roller; and the provision of a perfume dispenser for encapsulated perfume, the container being in earring or locket form, and in which the container is loaded with a single "cap" of tape containing capsules of perfume thereon. Other objects will be in part obvious and in part pointed out hereinafter.

The invention accordingly comprises the elements and combinations of elements, features of construction, and arrangement of parts which will be exemplified in the structures hereinafter described, and the scope of the application of which will be indicated in the appended claims.

Drawings

In the accompanying drawings, in which are illustrated four embodiments of the invention.

FIG. 1 is an illustration of a first embodiment of the invention with the cover thereof closed;

FIG. 2 shows a end view of the FIG. 1 embodiment with the cover raised or open;

FIG. 3 is a sectional view of the FIG. 1 embodiment, given to reveal the interior thereof and certain operating parts, the section being taken in the direction of sight lines 3—3 on FIG. 2;

FIG. 4 is a sectional view of the FIG. 1 embodiment taken in the direction of sight lines 4—4 of FIG. 3;

Throughout the drawings, similar reference characters indicate corresponding parts. The dimensions of certain of the parts as shown in the darwings may have been modified and/or exaggerated for the purposes of clarity of illustration.

Figure 5:
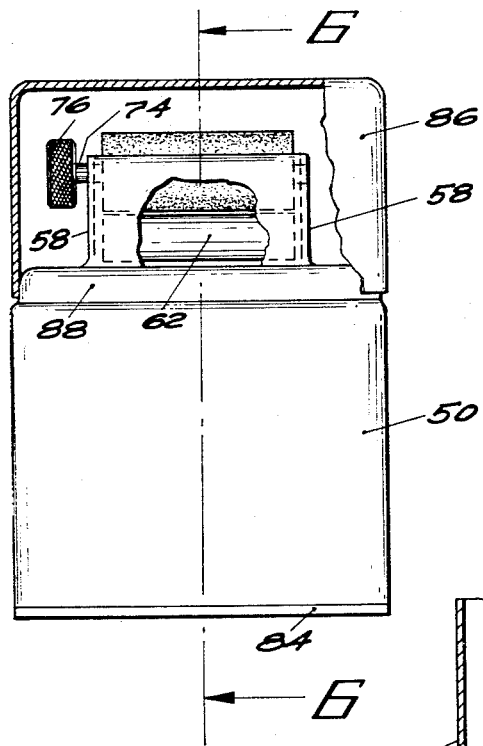
FIG. 5 is an illustration, partly in section, of a second embodiment of the invention.

Referring now to FIG. 1, which is an exemplary embodiment of the invention, a container 2 is shown having a cap or top 4 which is conventionally hinged by hinge 6 at one edge thereof to the end of the container. The container has a closed end 8, a portion of which is struck upwardly to form a flat anvil 10. End 8 is also provided with an exit slit 12. Another portion of the end plate 8 is pierced and formed outwardly to form a cutting bar 14 spanning the end for a purpose which will be described later.

An access door or cover 16 is provided which is hinged by hinge 18 to one edge of the container. The cover 16 is held in its closed position by means, for example, of conventional snap pins 19 engaging suitable holes in the casing wall.

Mounted within the casing 2 is a fixed post 20, the post being mounted on the interior face of one side of the casing as by a flange 22, the flange being either brased or welded to the side of the casing. The post 20 serves as a holder for a roll of tape 24, this tape containing perfume which has been micro-encapsulated.

Figure 15:
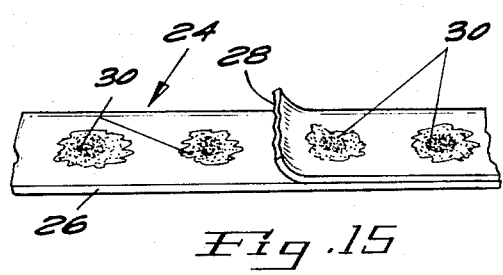
FIG. 15 is an illustration of a portion of the tape used in the instant invention in certain embodiments thereof.

Referring briefly to FIG. 15, a portion of the tape 24 is shown, the tape having the layers 26 and 28. One of these layers 28, has been pulled away from the other layer 26 in order to reveal the groups of capsules 30 of perfume, these capsules of perfume being in the order, for example, of approximately 0.025 inch in diameter, the encapsulation being done by means well known in the art today. The groups 30 are arranged in a series of groups along the length of the tape, as shown, the separation of which may be, for example, one-half inch.

The tape 24 may be of a thin absorbent paper, such as tissue paper, or many be made of a woven plastic material, or a woven cloth. When bi-layered, one of the layers, for example layer 26, may be a material which is impervious to fluid, while the other layer 28 would be of absorbent material. Other means may be utilized for attaching the capsules to the tape in the clusters or groups 30, the one being illustrated being a simple and relatively inexpensive way of so doing. An advantage of using the bi-layered construction is that when the capsules are crushed, as will be described below, the material of the capsules themselves, i.e., the wall materials, will be retained between the layers of the tape.

As indicated above, the tape 24 is wound in the form of a roll and the roll is slipped over the post 20 and held loosely thereon. Also mounted in the case are a pair of feed rolls 32 and 34, one of these rolls (32) being rotatably mounted on a fixed mounting post 36 which has its ends conventionally attached to the two side walls of the upper portion of the container 2. The other roll 34 is mounted on an axle 38 which is rotatably supported in a bearing 39 in one face of the container, the axle extending outwardly through a suitable bearing in the other face. To the outer end of axle 38 is fastened a knurled hand wheel 42 by means of which the roll 34 may be turned.

Preferably both the roll 32 and 34 are covered with felt or other soft material, since the function of the roll is only to grip the tape therebetween as shown and feed the tape out through the exit slit 12. The rolls are not to crush the capsules 30. Therefore, the rolls are placed close enough together to grip the tape to feed it outwardly without crushing the capsules 30.

The end 40 of the tape is fed out through the exit slit 30, beneath the cutter bar 14, as shown. When it is desired to use perfume from the device, the end of the tape is pulled outwardly until a group of capsules rests on the anvil 30. The cover 4 is then closed, and the capsules 30 are crushed between the anvil 10 and the inside face of the cover 4. After the capsules are crushed, then the end 40 of the tape having the crushed capsules is torn off against the edge of the cutter bar 14, and is used as a dauber to wipe the perfume, with which it has become saturated with perfume released from the crushed capsules, to the body of the user.

Figure 6:
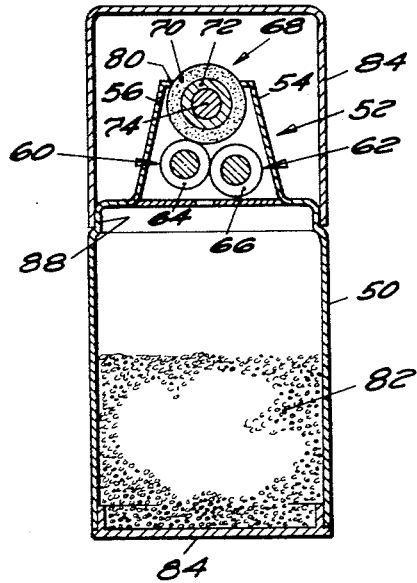
FIG. 6 is a section elevation of the FIG. 5 embodiment, taken in the direction of sight lines 6—6 thereon.
Figure 7:
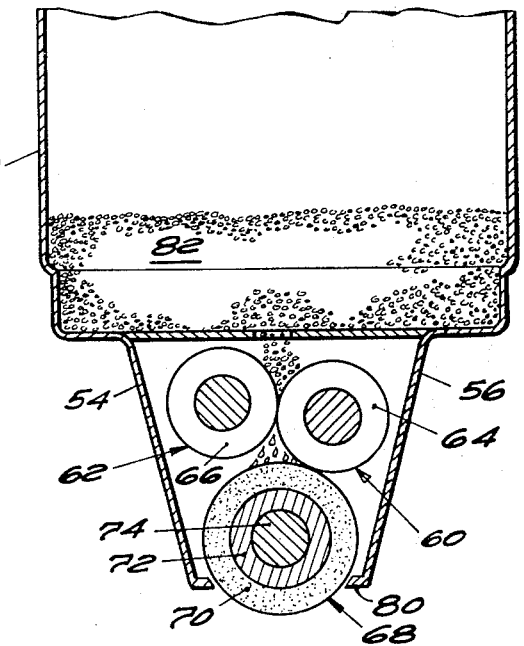
FIG. 7 is an enlarged sectional view of a portion of the FIG. 5 embodiment, showing the embodiment inverted and in use, the drawing being sectioned and enlarged in order to facilitate a better understanding of the invention.

Referring now to FIGS. 5–7 for a second embodiment of the invention, in this instance the capsules of perfume are held loosely in the container, and are not attached to any tape. The embodiment comprises a container 50 which may be any given shape, the container having its upper end (as viewed) terminating in a truncated cone-shaped nozzle indicated generally by numeral 52. Nozzle 52 has slanting side walls 54 and 56, and the parallel end walls 58. Rotatably mounted between the end walls 58 are three rollers which will not be described. Two of these rollers, 60 and 62, have their ends journaled in the side walls 58. The rollers are covered with sleeves 64 and 66 of hard material, and are positioned close enough together so that these sleeves press against each other. A material which would be found suitable is, for example, an elastomer, such as neoprene which is inert to the solvents used in the perfume. The function of the rollers 60 and 62 is to crush the capsules of perfume.

The third roller 68 comprises an outer felt sleeve 70, an inner sleeve 72, and an axle 74. Sleeve 72 functions to bind the felt 70 to an inner axle 74, but if desired, the felt sleeve may be directly attached to the axle. Axle 74 has one end journaled in one of the end walls 58, and the other end is similarly journaled in one of the end walls 58, and the other end is similarly journaled in the other end wall and projects outwardly as viewed. The outwardly projecting end has mounted thereon a knurled handwheel 76, the purpose of which is to rotate the felt covered roller 68. Roller 68 presses against roll 60 so that knob 76 is turned, the roll 60 is likewise turned.

Contained within the body of the container is a supply of loose capsules 82 of perfume, these capsules preferably being in the form of micro capsules having an order of magnitude of diameter of 0.010–0.025 inch.

The upper edges 80 of the walls 54 and 56 are formed inwardly so as to be closely adjacent the felt surface of the roll 68, and thus prevent any loose capsules from falling out of the container when the container is inverted.

The container 50 may be reloaded with loose capsules by unscewing a closure element 84 which is conventionally made and is threaded into the end of the container 50 in conventional manner.

The device is used as follows: With a supply of loose capsules of perfume 82 in the container, the container is inverted as shown in FIG. 7, with the result that the loose capsules now fall down the container until some of them come to rest against the rollers 60 and 62. If, now, the roller 68 is rotated by means of the hand wheel 76, this will in turn rotate the roller 60 and thus roller 62, with the result that capsules are drawn into the nip between these rollers and become crushed so as to free their perfume. The released perfume is now adsorbed on the surface of the roller 60, which, of course, is in contact with the felt covering 70 of the roller 68. The felt 70 absorbs the perfume released from the crushed capsules, and the roller 68 is continued to be turned until the felt has adsorbed what is deemed to be a sufficient quantity of liquid perfume. At this point, the projecting portion of the roller 68 is used as a felt applicator to daub the perfume where it is desired to have it placed on the body of the user.

In order to prevent evaporation of unused perfume on the roller 68, assuming that all of the perfume has not been used by the user thereof, a tight fitting cap member 86 may be provided which fits over a suitably formed shoulder 88 which is made at the end of the container 60 in conventional manner.

Figure 8:
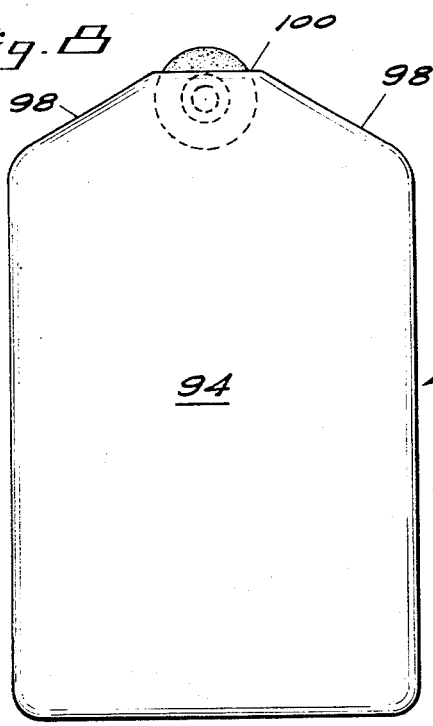
FIG. 8 is an elevation of a third embodiment of the invention.
Figure 9:
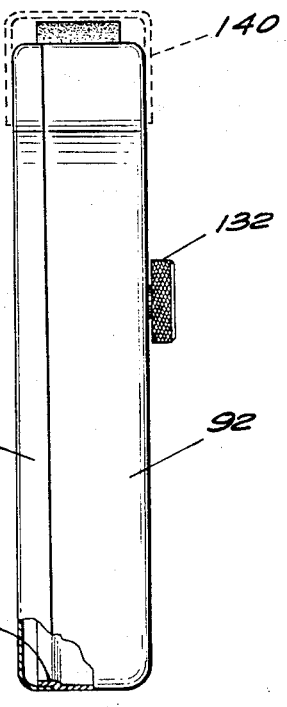
FIG. 9 is a side view of the FIG. 8 embodiment.
Figure 10:
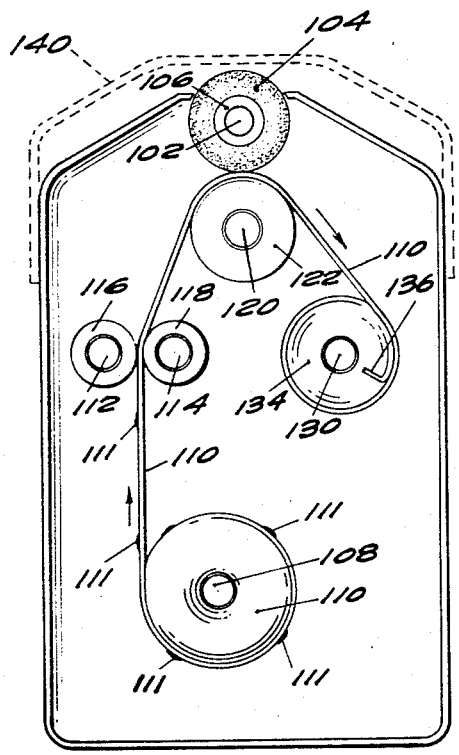
FIG. 10 is a view of the FIG. 8 embodiment, with the cover thereof removed in order to illustrate more clearly the arrangement of interior operating parts.

Referring now to FIGS. 8–10, there is shown a third embodiment of the invention. A container 90 is shown which comprises a case 92 having a closure side 94. Side 94 is fitted in conventional manner to the body 92, or may be a snap fit as shown, being sized to fit over a shoulder 96 which is formed entirely around the rim of the case 92.

The top end (as viewed) of the assembly of parts 92 and 94 is nicely and esthetically formed with the tapering upper end portions 98, these end portions terminating in a flat truncation 100. Mounted rotatably on an axle 102 which is conventionally fastened within the case 92 and extends transversely across the container, is a roller comprising a felt sleeve 104 mounted on an axle sleeve 106, a material such as a cement being used to fasten the felt sleeve 104 to the sleeve 106. Axle 102 is supported in a suitable conventional manner on the container 90.

Also mounted within the casing in conventional manner is a supporting post 108 which holds loosely thereon a supply of tape 110 which is similar in all respects to the tape 24.

Rotatably mounted on the posts 112 and 114 are sleeves 116 and 118 respectively, these sleeves being in close proximity to each other, so that when the tape 110 is pulled up therebetween, the capsules of perfume held on the tape will be crushed by the engagement of the sleeves 116 and 118. The mounting posts 112 and 114 are conventionally fastened in the container 90 as by riveting or welding. Also mounted on the container is the post 120 on which is rotatably mounted a sleeve 122, this sleeve being in contact with the felt covering 104.

An axle 130 is suitably journaled in the wall of the container portion 92, and has an end projecting outwardly of the wall of the cover 94, on which end is fixed a knurled hand wheel 132. Inside the container 92 there is mounted on the axle 130 a drum 134 having a slot 136 radially cut therein.

The end of tape 110, after passing through the nips of the rollers 116–118 and 122–104, is inserted in the slot 136 in order to be able to draw tape from supply roll 110 by turning the knob 132. The tape is wound up on the drum 134.

In use, as the tape is so wound up, the groups of capsules 111 on the tape (these groups corresponding to the groups 30 on the tape 24) are crushed by passing through the nip of the rollers 116 and 118. The tape material holds the free perfume which has now been released until the tape passes between the nip of the rollers 122 and 104. As the crushed capsules and the wet tape pass through these two rollers, the felt 104 adsorbs the perfume. Roller 104 is continued to be turned until that portion of the felt of roller 104 which has adsorbed the liquid perfume now faces outwardly of the container. At this point, the felt of roller 104 may be used as an applicator to apply perfume to the skin of the user.

If desired, a tightly fitting cap 140 (here shown in dotted lines since it is optional) may be used.

Figure 11:
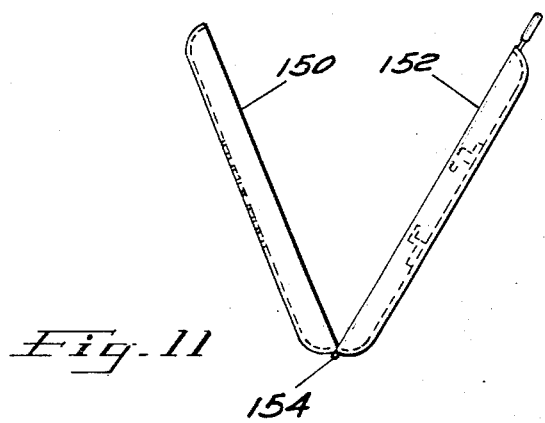
FIG. 11 is an illustration of a fourth embodiment of the invention, this embodiment being in the form of a locket, and the locket being shown in a partially open position.
Figure 14:
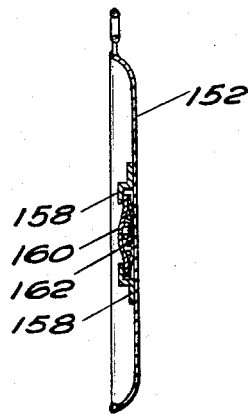
FIG. 14 is a sectional view of the FIG. 13 leaf, taken in the direction of sight lines 14—14 thereon.
Figure 12:
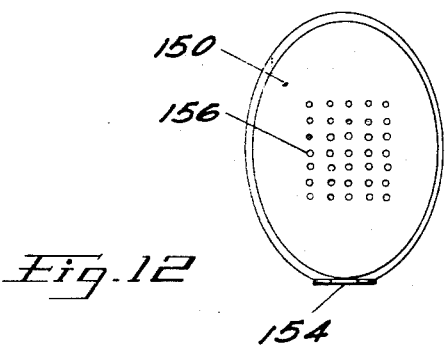
FIG. 12 is a plan view of one leaf of said locket.
Figure 13:
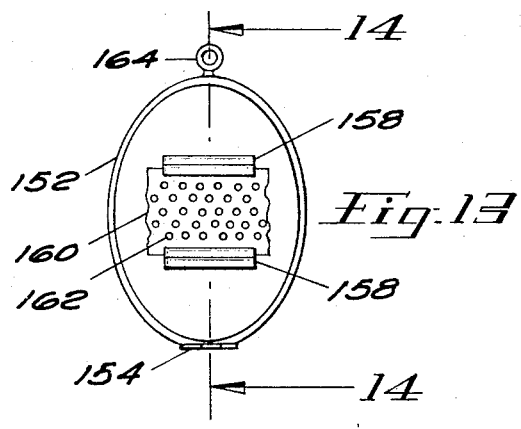
FIG. 13 is a plan view of the other leaf of said locket.

Referring now to FIGS. 11–14, there is shown a fourth embodiment of the invention, in which the container takes the form of a locket which may be used as a pendant, or may be used as an earring attachment. A side view of the locket partly open is shown in FIG. 11, and it comprises the two leaves or shells 150 and 152. These shells are conventional insofar as their general configuration is concerned, and are attached together by the hinge 154 at their bottom edge as shown. The face of the shell 150 is provided with a group of small perforations 156. (This face will hereafter be called the back of the locket. The other face 152 will be called the front.) The purpose of the perforations 156 is to enable perfume to be released from the interior of the locket to the exterior in a manner which will be later described.

Attached to the inside face of the front 152 are a pair of clips 158, these clips being conventional in shape and attached by conventional means (such as soldering or brazing) to the inside face of the shell 152. As shown, the clips have inwardly turned edges, and the clips 158 are so positioned that when a small piece or "cap" of tape 160 is inserted between the opposing clips 158 and held thereby, the tape 160 will be juxtaposed to the perforations 156 when the locket is closed. The tape 160 is a portion of a tape similar to that shown for use in the first embodiment, and has carried thereon the encapsulated perfume group 162, just as in the case of the tape 24. The user of the locket will preferably carry a small supply roll of such tape, and will tear a piece of tape therefrom having one of the groups of perfume capsules. This section 160 is inserted between the clips 158, as shown, and the locket closed.

In such a condition, the perfume is entirely contained in the capsules 162, does not leak therefrom, and therefore is long lasting.

When it is desired to release the perfume from the capsules 162, all that is necessary is to squeeze the faces of halves 150 and 152 together. The result of this is that the capsules are squeezed between the two faces, and the perfume is enabled to escape to the exterior of the locket by means of the perforations 156.

In order to suspend the locket from a chain or from an ear fastening, a conventional eyelet 164 may be provided at the top thereof. The two halves 150 and 152 may be held in closed position by a conventional catch, which is not shown. Also, other means than the clips 158 may be used for holding the tape section 160 therebetween.

Figure 16:
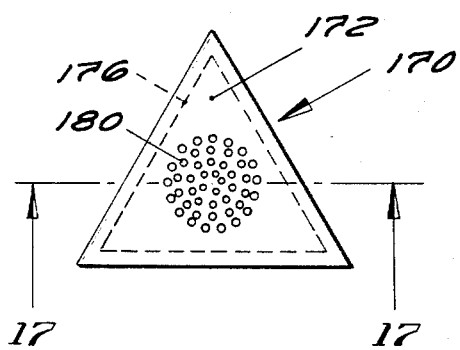
FIG. 16 is a plan view of a fifth embodiment of the invention.
Figure 17:
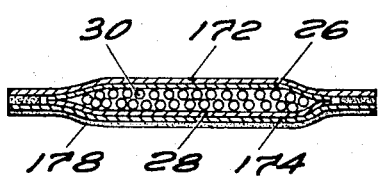
FIG. 17 is a sectional elevation of the FIG. 16 embodiment taken along sight lines 16—16 thereon.

Referring now to FIGS. 16 and 17, there is shown yet another embodiment of the invention, in which the container for the encapsulated perfume is in the form of a beauty patch 170. In this instance, merely by way of example, the beauty patch is shown as being triangular in shape, but obviously it can take other shapes as desired. Also, its size can be that which will be found acceptable by women who wish to wear such patches.

Beauty patch 170 comprises the front layer 172 and back layer 174 which are cemented together around their edges as indicated by the dotted lines 178 to form the container for the perfume capsules. Within the space separating the two layers 172 and 174 there is placed a "cap" (that is, a short length) of the encapsulated perfume tape such as is shown in FIG. 15, the cap comprising the layers 28 and 30 which hold between them the capsules 30 of perfume. Layers 28 and 30 are made of absorbent tissue paper, as described above, and in this embodiment the capsules are made relatively small since the beauty patch itself will be small. The layer 172, which is the outer layer as the patch is worn, can be colored on its surface in any color desired such as black or silver, etc., and is provided with the perforations 180. The function of these perforations is to permit the escape of the vaporized perfume when the capsules 30 are crushed. The back surface of layer 174 is coated with an adhesive 178 which may be moistened by liquid so that the patch may be stuck to the skin of the wearer at desired locations.

The patches may be carried by the user and when it is desired to apply them, either the capsules may be first crushed by pressing the layers 172 and 174 together for that purpose, the adhesive 178 thereafter being moistened and the patch applied to the skin of the wearer; or, the adhesive 178 may be first moistened and the patch applied to the skin of the wearer, whereupon by pressing the layer 172 against the layer 174 the capsules are then broken to release the perfume.

In view of the above, it will be seen that the several objects of the invention are achieved and other advantageous results are attained.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As many changes could be made in the above constructions without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

Having described the invention, what is claimed is:

1. A perfume dispenser comprising in combination a supply of perfume in encapsulated form; a container for holding loosely within its interior the perfume capsules in uncrushed condition; manually operable means associated with the container for crushing the perfume capsules to release the perfume therefrom to the exterior of the container; and a pair of opposed rotatable crushing rollers mounted within the container; said manually operable means being a manually operable felt roller mounted at one end of the container and engaging one of the crushing rollers to turn the latter when the felt roll is turned, a portion of the felt roller being exposed to the exterior of the container; whereby, when the container is turned to permit loose capsules to rest against the crushing rolls and the felt roller is manually turned, the crushing rollers turn and crush capsules between them, the released perfume being gathered by the felt roller and conveyed to the exterior of the container.

2. A perfume dispenser comprising in combination a supply of perfume in encapsulated form; a container for holding within its interior the perfume capsules in uncrushed condition; and manually operable means associated with the container for crushing the perfume capsules to release the perfume therefrom to the exterior of the container; the capsules of perfume being attached to an elongated tape of material in a series of separated groups of capsules, the container including a pair of opposed rollers, and the tape being threaded between the rollers with one of the rollers being rotatable from outside the container, whereby a portion of the tape may be pulled from its supply and ejected outside the container.

3. A perfume dispenser comprising in combination a supply of perfume in encapsulated form; a container for holding within its interior the perfume capsules in uncrushed condition; and manually operable means associated with the container for crushing the perfume capsules to release the perfume therefrom to the exterior of the container; the capsules of perfume being attached to an elongated tape of material in a series of separated groups of capsules; the container including a pair of opposed crushing rollers, the tape being threaded between said rollers, and said rollers being spaced so close together that when tape is moved therebetween, capsules of perfume on the tape are crushed; the container also including an idler roller and a felt roller in contact with each other, a portion of the felt roller protruding outside the container, the tape passing between the idler roller and the felt roller whereby perfume from the crushed capsules may be soaked up by the felt roller and conveyed to the outside of the container as the felt roller rotates; and said manually operable means including a manually rotatable tape-up roll for pulling tape from a supply thereof through said crushing rollers and said idler and felt rollers.

4. The dispenser of claim 2 including a flat anvil forming a portion of the top of the container at one end thereof, and a cover member rotatably held at said end and positioned to be forced against the anvil, whereby the length of tape ejected by said rollers may be placed between the anvil and the cover in position to have the perfume capsules crushed.

References Cited

UNITED STATES PATENTS

| | | | |
|---|---|---|---|
| 1,691,237 | 11/1928 | Grisbie | 42—54 |
| 2,163,355 | 6/1939 | Sechrist | 401—208 |
| 2,209,914 | 7/1940 | Gerber et al. | 239—34 |
| 2,615,754 | 10/1952 | Lindenberg | 239—36 |
| 2,740,662 | 4/1956 | Scott | 239—36 |
| 2,932,045 | 4/1960 | Rabelow | 401—186 |
| 2,999,642 | 9/1961 | Stone | 239—55 |
| 3,185,394 | 5/1965 | Farrell | 239—36 |
| 3,272,533 | 9/1966 | Allen | 239—34 |

EVERETT W. KIRBY, *Primary Examiner.*

U.S. Cl. X.R.

239—34, 36, 55; 401—208, 218